No. 849,947. PATENTED APR. 9, 1907.
B. WAGNER.
APPARATUS FOR COKING BRIQUETS.
APPLICATION FILED DEC. 18, 1905.
4 SHEETS—SHEET 1.
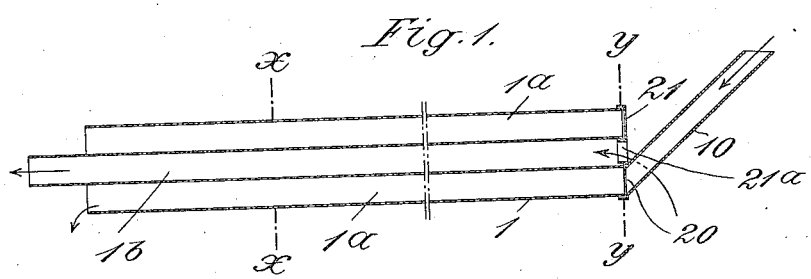
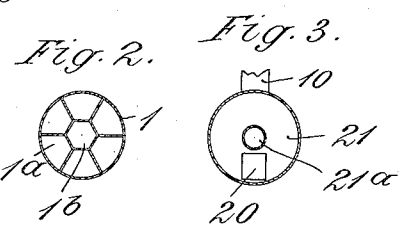
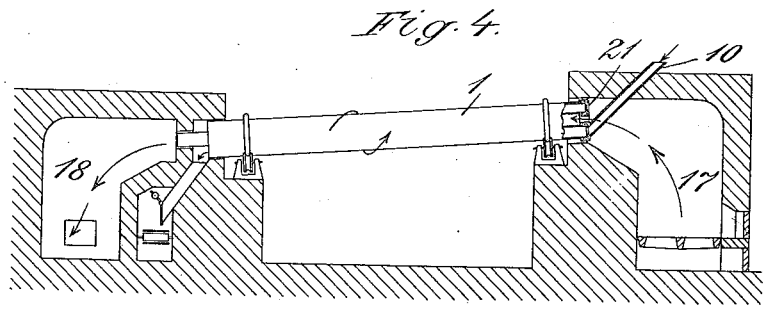
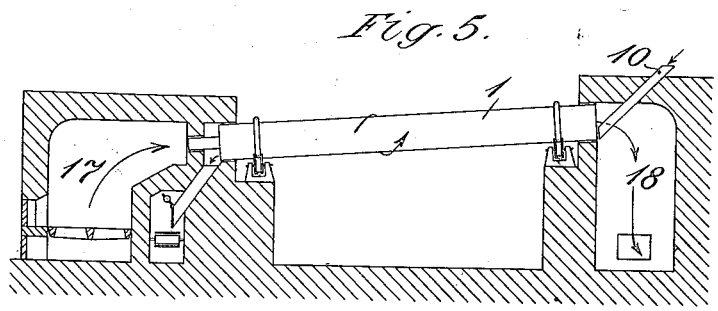
Witnesses
T. P. Britt
E. C. Duffy
Inventor
Bernhard Wagner
per
C. E. Duffy & Son
Attorneys No. 849,947. PATENTED APR. 9, 1907.
B. WAGNER.
APPARATUS FOR COKING BRIQUETS.
APPLICATION FILED DEC. 18, 1905.

4 SHEETS—SHEET 2.

Witnesses
T. P. Britt
E. C. Duffy

Inventor
Bernhard Wagner
per
T. E. Duffy & Son
Attorneys

No. 849,947. PATENTED APR. 9, 1907.
B. WAGNER.
APPARATUS FOR COKING BRIQUETS.
APPLICATION FILED DEC. 18, 1905.

4 SHEETS—SHEET 3.

Witnesses
T. P. Britt
E. C. Duffy

Inventor
Bernhard Wagner,
per
C. E. Duffy
Attorneys

No. 849,947.  
PATENTED APR. 9, 1907.  
B. WAGNER.  
APPARATUS FOR COKING BRIQUETS.  
APPLICATION FILED DEC. 18, 1905.

4 SHEETS—SHEET 4.

Witnesses  
T. P. Britt  
E. C. Duffy

Inventor  
Bernhard Wagner,  
per  
O. E. Duffy  
Attorneys

UNITED STATES PATENT OFFICE.

BERNHARD WAGNER, OF STETTIN, GERMANY.

APPARATUS FOR COKING BRIQUETS.

No. 849,947.  Specification of Letters Patent.  Patented April 9, 1907.

Application filed December 18, 1905. Serial No. 292,223.

*To all whom it may concern:*

Be it known that I, BERNHARD WAGNER, merchant, a subject of the King of Prussia, residing at No. 99 Kaiser Wilhelmstrasse, Stettin, German Empire, have invented new and useful Improvements in Apparatus for Coking Briquets, of which the following is a specification.

In my United States patent application, Serial No. 243,948, dated February 3, 1905, Patent No. 829,448, August 28, 1906, I have disclosed certain apparatus for rendering so-called "brick fuel" or "briquets" weather-proof by coking the binding agent, which is soluble in water, used in the manufacture thereof. According to the invention the briquets are conducted through an inclined rotary drum communicating at one end with a furnace and at the other end with a smoke-chamber, and this drum automatically turns the briquets and feeds them forward in such manner that the briquets charged into the drum when delivered therefrom are weather-proof.

My present invention relates to improvements in apparatus of the kind referred to in which the briquets instead of being exposed to the direct action of the furnace-gases, as described in the said patent application, are heated indirectly, the furnace-gases acting upon the outer walls of the various chambers. The heating-gases may, as described in the said patent, pass through the apparatus either in the same direction as the briquets or in a direction contrary thereto. Furthermore, the gases after they have heated the briquets by indirect action may be caused to act directly thereupon, or, vice versa, they may first act directly and then indirectly on the briquets, depending upon the nature of the composition of the material from which the briquets are made.

My invention is illustrated in the accompanying drawings, in which—

Figure 6:
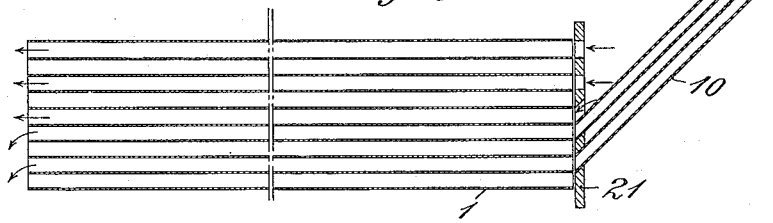
Figure 7:
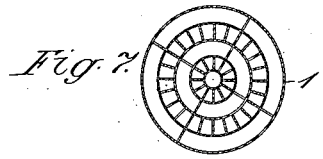
Figure 8:
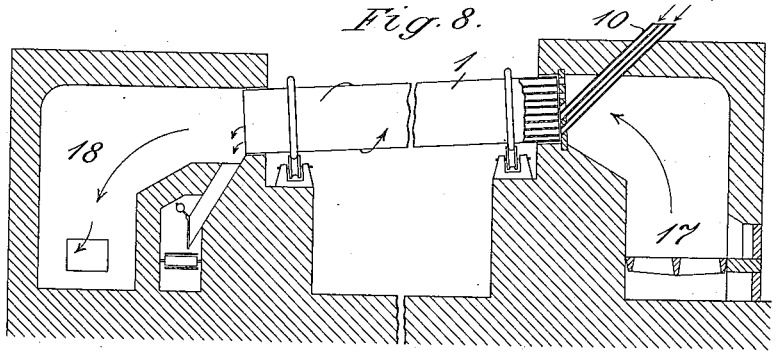
Figure 9:
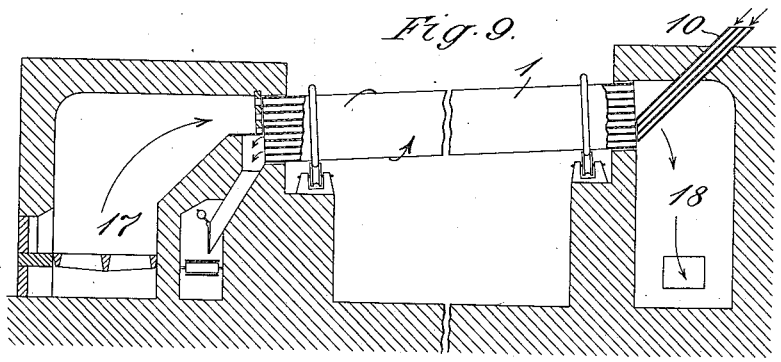
Figure 10:
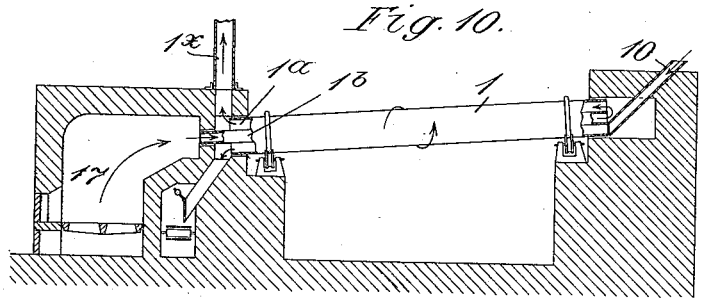
Figure 11:
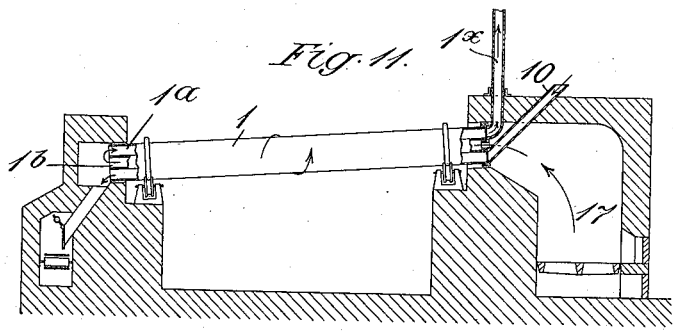
Figure 12:
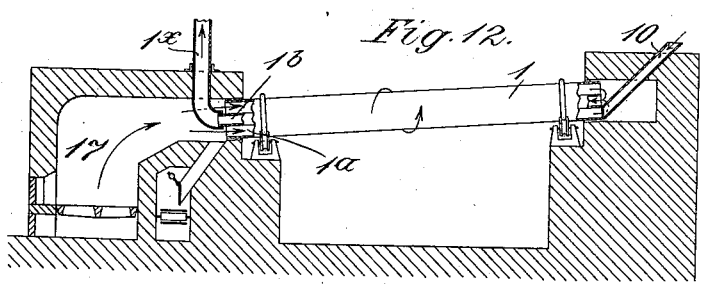
Figure 13:
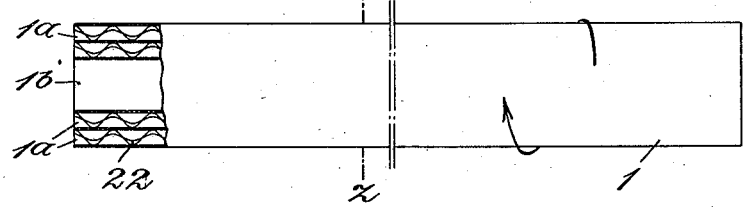
Figure 14:
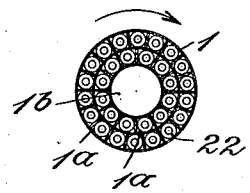
Figure 15:
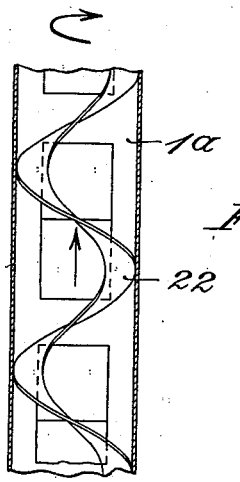

Figure 1 is a diagrammatic longitudinal section of a drum having six coking-chambers, together with feed-hopper. Fig. 2 is a cross-section on the line $x$ $x$ of Fig. 1. Fig. 3 is a cross-section on the line $y$ $y$ of Fig. 1. Fig. 4 is an elevation of a complete plant embodying the coking-drum shown in Fig. 1 drawn to a reduced scale. Fig. 5 is a like view of a similar plant, but so designed that the furnace-gases pass in contrary direction to that of travel of the briquets. Fig. 6 is a diagrammatic fragmentary longitudinal section of a drum having two groups of coking-chambers, together with feed-hopper. Fig. 7 is a cross-section through this drum. Fig. 8 is a fragmentary longitudinal section of a complete plant embodying the drum shown in Fig. 6 drawn to a reduced scale. Fig. 9 is a like view of a similar plant, but of such design that the furnace-gases pass in a contrary direction to that of travel of the briquets. Fig. 10 is a longitudinal section of a plant of such construction that the furnace-gases act both indirectly and directly on the briquets. Fig. 11 is a like view of a plant differing from that shown in Fig. 10, inasmuch as the furnace-gases first pass through the central chamber in the same direction as that in which the briquets travel in the coking-chambers. Fig. 12 is a like view of a plant in which the furnace-gases first act directly and then indirectly on the briquets. Fig. 13 is a diagrammatic fragmentary elevation and part section of a drum the coking-chambers of which are fitted with screw-blades. Fig. 14 is a cross-section on the line $z$ $z$ of Fig. 13. Fig. 15 is a longitudinal section of a fragment of a coking-chamber provided with a screw-blade drawn to a larger scale.

Referring more particularly to the form of apparatus shown in Figs. 1-4, the heating-gases from the furnace 17 pass through the central chamber $1^b$ of the drum 1 to the smoke-chamber 18 in the same direction as the briquets travel through the apparatus, so that these gases act upon the walls of the chambers $1^a$ containing the briquets, and thus heat the latter. For the purpose of preventing the access of the furnace-gases to the coking-chambers $1^a$ of the drum the latter are closed at the furnace end by a stationary plate 21, which has in addition to the central fire-gas inlet $21^a$ only one aperture 20, Fig. 3, to enable communication with the feed-hopper 10.

In Fig. 5 the arrangement is reversed in so far that the furnace-gases pass through the central drum-chamber $1^b$ in a direction contrary to that in which the briquets travel through the coking-chambers $1^a$.

The construction shown in Figs. 1 to 5, inclusive, consists of two concentric cylinders or tubes, the space between the two cylinders or tubes being divided longitudinally by transverse partitions into any desired number of compartments, six compartments being shown in Fig. 2. These partitions may be perforated or unperforated, so that the various compartments may or may not communicate therethrough. These cylinders are supported in any well-known way and by any well-known means, whereby a rotary motion may be imparted to said cylinders by suitable well-known means.

With the apparatus shown in Figs. 6 and 7 the walls of two or more groups of coking-chambers can be heated simultaneously by the furnace-gases. In Fig. 8 such an apparatus is shown in which the heating-gases flow in the same direction as that in which the briquets travel. In Fig. 9 the gases and the briquets travel in opposite directions.

The construction shown in Figs. 6 to 9, inclusive, is composed of a series of cylinders concentric to each other, in the present instance five cylinders being shown. These cylinders are so constructed and arranged that alternating chambers are formed for the passage of the heating-gas and the passage of the briquets to be treated. Suitable means are provided for supporting and rotating the same, as described above in connection with Figs. 1 to 5.

The furnaces-gases instead of only acting indirectly may also exert a direct action. They may act first indirectly on the briquets and then directly, or vice versa.

In the apparatus illustrated in Fig. 10 the furnace-gases first pass through the central chamber 1$^b$ in the opposite direction to that of travel of the briquets and then flow through the coking-chambers 1$^a$ in the same direction as that in which the briquets travel, escaping finally through a pipe 1$^x$ to the atmosphere. In the apparatus shown in Fig. 11 the arrangement is similar, but reversed. The furnace-gases first pass through the chamber 1$^b$ in the direction of travel of the briquets and then return in the contrary direction through the coking-chambers 1$^a$. With these constructions of the apparatus also several groups of chambers may naturally be heated simultaneously, if desired.

If the briquets are to be heated first direct and then indirect, an apparatus such as shown in Fig. 12 may be used. The furnace-gases here pass first through the coking-chambers 1$^a$ in the contrary direction to that in which the briquets travel and then return through the central chamber 1$^b$ in the same direction as that in which the briquets move.

The construction of cylinder shown in Figs. 10 to 12, inclusive, is substantially the same as that shown and described in connection with Figs. 1 to 5 and would need no further description here. In all of the constructions shown suitable means, such as hoppers, are provided for charging the cylinders with briquets, and suitable discharge means and receptacles are provided for receiving the coked briquets.

The coking-chambers of the inclined rotating drum feeding the briquets automatically from the top to the bottom end may be advantageously arranged in such manner that premature exit of the briquets from the coking-casing is prevented—that is to say, means may be provided which insure of all the briquets alike being exposed to the action of the furnace-gases for such uniform period as is necessary for coking of the binding agent. Figs. 13-15 show an apparatus constructed in this manner. The inner walls of the coking-chambers 1$^a$ are provided with screw-blades 22, which, as Fig. 15 shows, cross the train of briquets, and thus constitute partitions, retarding the free advance of the row of briquets, to a certain extent without, however, actually obstructing the proper feed and regular turning of the briquets. In this way guarantee is offered for each individual briquet remaining the same length of time in the coking-casing, so that each briquet is submitted to the same coking process both as regards duration and the action of the furnace-gases, whereby also guarantee is given that each briquet which leaves the coking-drum is actually weather-proof. Instead of continuous screw-blades merely parts or sections of such blades may be provided in any suitable manner. The blades may also be perforated, if desired, in order that uniform action of the furnace-gases upon the briquets may not be interfered with.

Having thus described my invention, I claim as new—

1. In apparatus for treating briquets, an inclined, rotary drum, presenting a plurality of coking-chambers having a briquet-inlet at the upper end and a briquet-exit at the lower end, and an independent heating-gas chamber having an inlet at one end and an outlet at the opposite end, whereby the heating-gases heat the outer walls of the coking-chambers and thus act indirectly on the briquets, substantially as described.

2. In apparatus for treating briquets, an inclined, rotary drum, presenting a plurality of coking-chambers having a briquet-inlet at the upper end and a briquet-exit at the lower end, and an independent heating-gas chamber having an inlet at the lower end and an outlet at the upper end, whereby the heating-gases pass in counter direction to the briquets and act indirectly on them, substantially as described.

3. In apparatus for treating briquets, an inclined, rotary drum, presenting a plurality of groups of coking-chambers having a briquet-inlet at the upper end and a briquet-outlet at the lower end, and a plurality of heating-gas chambers having an inlet at one end and an outlet at the opposite end, whereby the heating-gases heat the outer walls of all the coking-chambers and thus act indirectly on all the groups of briquets simultaneously, substantially as described.

4. In apparatus for treating briquets, an inclined, rotary drum, presenting a plurality of coking-chambers having a briquet-inlet at the upper end and a briquet-exit at the lower end, and an independent heating-gas chamber having an inlet at one end and an outlet at the opposite end, and screw-shaped members located in the coking-chambers, whereby the heating-gases heat the outer walls of the coking-chambers and thus act indirectly on the briquets, while the said members insure thorough and uniform coking, substantially as described.

5. An apparatus for treating briquets comprising an inclined rotary cylinder having located therein a concentric cylinder, means for feeding briquets to one of said cylinders, a furnace and means for directing the furnace-gases through said concentric cylinders successively, substantially as described.

In witness whereof I have hereunto signed my name, this 29th day of November, 1905, in the presence of two subscribing witnesses.

BERNHARD WAGNER.

Witnesses:
  WOLDEMAR HAUPT,
  HENRY HASPER.